7/23/85 RE 32,218

United States Patent [19]

Kunert

[11] E Patent Number: Re. 32,218

[45] Reissued Date of Patent: Jul. 29, 1986

[54] AUTOMOTIVE WINDSHIELD

[75] Inventor: Heinz Kunert, Cologne, Fed. Rep. of Germany

[73] Assignee: Verienigte Glaswerke GmbH, Aachen, Fed. Rep. of Germany

[21] Appl. No.: 581,197

[22] Filed: Feb. 17, 1984

Related U.S. Patent Documents

Reissue of:

[64] Patent No.: 4,378,484
Issued: Mar. 29, 1983
Appl. No.: 186,456
Filed: Sep. 12, 1980

[51] Int. Cl.[4] ..... H05B 3/26; E06B 7/00

[52] U.S. Cl. ..... 219/203; 15/250 R; 15/250.19; 296/84 R; 219/522; 219/547

[58] Field of Search ..... 15/250 R, 250.16, 250.17, 15/250.19, 250.05; 296/84 R, 95 Q; 219/522, 547, 203, 543

[56] References Cited

U.S. PATENT DOCUMENTS

| | | | |
|---|---|---|---|
| 1,732,417 | 10/1929 | Pritchard | 15/250.19 |
| 2,759,214 | 8/1956 | Madunich | 15/250.16 |
| 2,974,340 | 3/1961 | Kopcynski | 15/250 R |
| 3,623,906 | 11/1971 | Akeyoshi et al. | 219/203 |
| 3,781,524 | 12/1973 | Levin . | |
| 3,908,222 | 9/1975 | Scott | 15/250 R |
| 4,109,133 | 8/1978 | Hanle et al. . | |
| 4,135,078 | 1/1979 | Kuiff et al. | 219/547 X |
| 4,373,130 | 2/1983 | Krasborn et al. . | |

FOREIGN PATENT DOCUMENTS

| | | | |
|---|---|---|---|
| 13970 | 8/1980 | European Pat. Off. . | |
| 1911991 | 9/1970 | Fed. Rep. of Germany | 15/250 R |
| 2457889 | 6/1975 | Fed. Rep. of Germany . | |
| 2507037 | 2/1976 | Fed. Rep. of Germany . | |
| 2902748 | 9/1980 | Fed. Rep. of Germany . | |
| 49-58110 | 6/1974 | Japan . | |
| 14513476 | 5/1975 | Japan . | |
| 1634575 | 5/1975 | Japan . | |
| 50-22055 | 7/1975 | Japan . | |
| 1447936 | 9/1976 | United Kingdom . | |
| 1512327 | 6/1978 | United Kingdom | 15/250 R |

*Primary Examiner*—Peter Feldman
*Attorney, Agent, or Firm*—Pennie & Edmonds

[57] ABSTRACT

A windshield for automotive vehicles is disclosed wherein one or more scraping edges are disposed on its external side in the area wiped by the wiper blades. The scraping edges are an enamel-type material which is formed into strip-shaped profiles and bonded in in raised form to the surface of the glass plate. Varying amounts of metal particles may be added to the enamel material to make it conductive, and, when connected to the vehicle's electrical system, able to thaw ice and snow which accumulates on the lower part of the windshield immobilizing the wiper blade arm. The scraping edges or profiles are positioned at appropriate angles on the windshield to permit water scraped from the windshield wiper blades to run off easily to both sides.

41 Claims, 8 Drawing Figures

Fig. 1
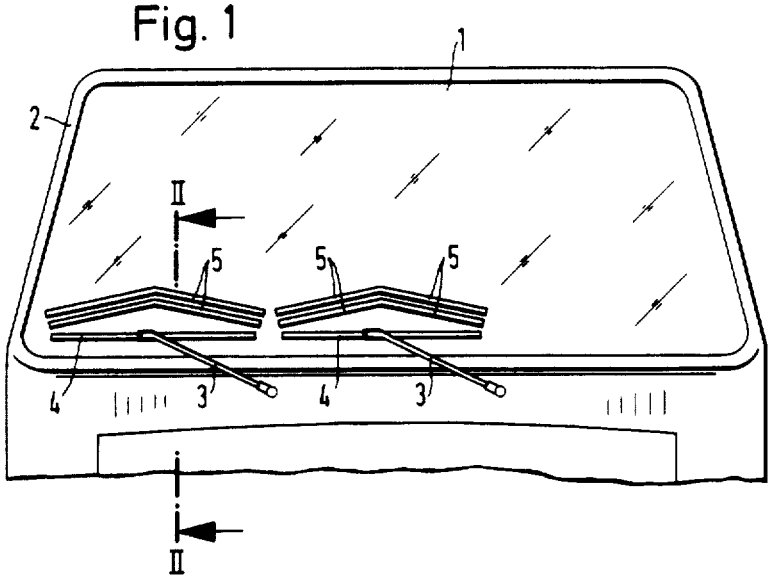
Fig. 2
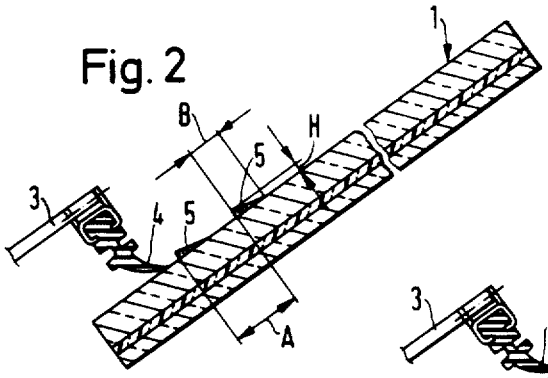
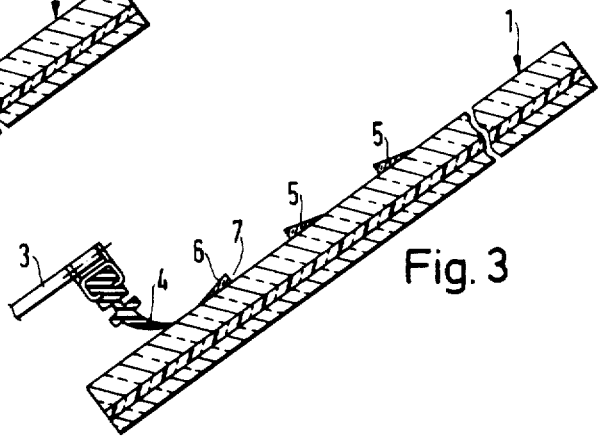
Fig. 3
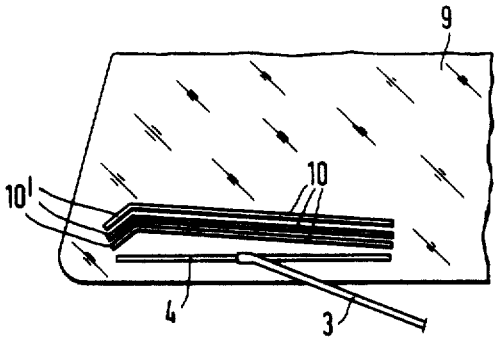
Fig. 4

AUTOMOTIVE WINDSHIELD

Matter enclosed in heavy brackets [ ] appears in the original patent but forms no part of this reissue specification; matter printed in italics indicates the additions made by reissue.

FIELD OF THE INVENTION

The present invention relates to a windshield for automotive vehicles which comprises on its external side in the area wiped by the wiper blades one or more scraping edges for the wiper blades. The scraping edges may advantageously consist of enamel-type material which may be intimately bonded to the windshield glass surface by screen printing. Varying amounts of metal particles may be added to the enamel in order to make it conductive and available to be connected to the electrical system of the vehicle to thaw accumulated ice and snow.

The improved automotive windshield of the present invention is not only useful for cleaning windshield wiper blades during use, it is also useful to thaw snow or ice which has accumulated on the lower part of the windshield thereby freeing the windshield wiper of such impediments.

SUMMARY OF THE INVENTION

The present invention relates to a windshield for automotive vehicles. More particularly, the present invention relates to a windshield for automotive vehicles having one or more scraping edges to remove dirt particles from the wiper blades. Heretofore, windshield constructions which sought to incorporate a windshield wiper blade cleaning feature, formed scraping edges through the means of grooves approximately 2 mm, wide and 1 mm. deep which were ground into the glass plate. The purpose of the scraping edges formed by the grooves of the prior art was, as in the present invention, to remove from the wiper blades the dirt particles and water adhering to them. This ensures on the one hand that the area wiped by the windshield blade is not continually made dirty again by the dirt and water adhering to the wiper blade. In addition, the grooves greatly reduced the danger of damage to the glass surface which is due to the fact that the dirt particles are frequently hard and granular substances which adhere to the wiper blades and roughen the surface by a grinding action. New dirt particles adhere to such roughened and scratched surfaces which, together with the roughness, cause dispersion of light at the windshield. Of course, dispersion phenomena reduce the distance of perception during night travel. It was possible to largely eliminate or at least greatly reduce these disadvantages by providing a scraping edge formed by grooves for the wiper blades.

However, the grinding of a groove into the glass surface in order to provide a scraping edge not only involves considerable costs in labor, it also has the additional disadvantage that it considerably reduces the strength of the windshield. In certain glass types, for example thermally or chemically prestressed glass plates, it is not possible at all to grind such grooves after the plates are finished, because this would result in the total destruction of the glass plates.

It is the purpose of the invention to design a windshield of this type in such a manner that it can even be made from prestressed glass plates and that no substantial weakening of the surface takes place. These ends are effected by having the scraping edges formed by strip-shaped profiles which are provided on the surface of the glass plate in raised form.

The present invention will now be described in more detail in conjunction with the figures wherein:

FIG. 1 is a view of a windshield according to the invention with schematically shown windshield wipers;

FIG. 2 is a cross section along line II—II of the windshield shown in FIG. 1;

FIG. 3 is a cross section through another embodiment of a windshield according to the invention;

FIG. 4 is another embodiment of the geometric shape as a profile;

DETAILED DESCRIPTION OF THE PREFERRED EMBODIMENTS

Figure 5:
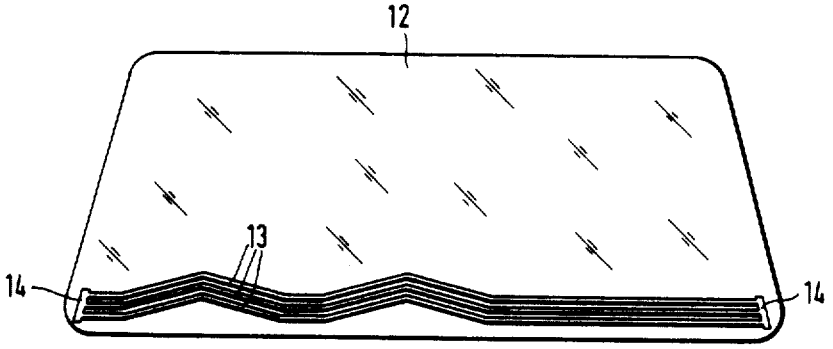
FIG. 5 is the view of a windshield in which the profiles forming the scraping edges serve simultaneously as heating conductors.

FIGS. 1 and 2 show a windshield 1 of laminated glass which is installed in window frame 2 of the car body. The car body comprises wiper arms 3 supporting wiper blades 4, here shown in the rest position. On the exterior side of the glass surface strip-shaped profiles 5 are located above the rest or parked position of the wiper blades 4. The length of these profiles 5 is approximately equal to the length of the wiper blades 4. They are arranged in the shape of a roof and each partial section encloses such an angle with the horizontal that on one hand the wiper blade forms an acute angle with the profiles when it passes over the profile and on the other hand the angle is sufficient to let the water scraped from the windshield wiper run off easily to both sides. As shown, the scraping edges of the profiles have the form of an inverted V with an obtuse angle included between the two arms of the inverted V.

Cross section and dimensions of profiles 5 are shown in FIG. 2. It can be seen, in particular, that the cross section of the profiles is wedge-shaped or sawtooth-shaped, with the surface forming the scraping edge itself approximately perpendicular to the surface of the glass plate. The height H of the profiles is approximately 1 mm, the width B approximately 2 to 3 mm, and the distance A between the perpendicular surfaces of two parallel profiles approximately 10 mm.

The purpose of the invention can be achieved without the windshield wiper blades passing over the scraping edge in each cycle of movement. It is, for example, quite sufficient if the windshield wiper blades pass over the scraping edges only after a certain number of cycles. A control circuit, not shown, for the wiper movement can be provided for this purpose which ensures that in a normal cycle the wiper blade reverses direction above the scraping edge without passing over or touching this edge and that it passes the scraping edge only in each tenth cycle.

FIG. 3 shows an embodiment in which below two profiles 5 whose inclined surface is sloped upward there is provided another profile 6 whose inclined surface is sloped downward. In this manner a discharge channel 7 for the water scraped from the wiper blades is formed between the lower of the two profiles 5 and profile 6. The scraping edge formed by profile 6 ensures that, when the wiper blade moves downwards, the dirt adhering to its lower surface is removed from the wiper blade, while it is the purpose of the scraping edges formed by profiles 5 to remove, when the wiper blade moves upwards, the dirt adhering to the upper surface of said wiper blade and to flush this dirt from the wiper blade with the aid of the water dragged along by the wiper blade.

In principle the profiles may also have other geometrical shapes. They may, for example, be straight or curved over their entire length. Care must only be taken to ensure that the profile is positioned at a sufficient angle with the horizontal to facilitate the running off of the water which has been removed from the wiper blade. In the embodiment shown in FIG. 4, three profiles 10 are placed one above the other, which are essentially straight-lined and comprise merely at one end a section 10' with the opposite slope.

Profiles 5 and 10 consist of enamel-type material intimately bonded to the glass surface. Such materials, commercially available under the description "ceramic baking enamels", are applied in the form of paste to the cold glass plate by means of a suitable process. Screen printing has proved to be a suitable application process, for example. The desired cross section of the profiles is achieved by suitable design of the screen printing template or by printing several layers on top of each other. The applied enamel paste is dried and then baked at high temperatures. As temperatures of approximately 580° to 650° C. are required for the baking enamels, the baking is preferably done in connection with the heating which is in any event required for the bending and/or prestressing of the glass plates. A suitable baking enamel with a baking range between 580° and 620° C. is, for example, obtainable from BLYTHE COLOURS B.V. under catalog number 39.269/5/63.

Enamels made conductive by containing varying amounts of metal particles may also be suitable as materials of the profiles. Profiles 13 may therefore be applied as continuous conductors extending over the entire width of windshield 12, as shown in FIG. 5. At their lateral ends the profiles 13 are connected to bus bars 14 which are connected to the electrical system of the vehicle by suitable connectors. In the embodiment shown in FIG. 5, three profiles 13 placed parallel to each other are electrically connected in parallel and thus form a narrow heatable area over the entire width of the lower part of the windshield which is used to thaw the snow accumulating on this part of the windshield i.e., to free the windshield wiper by thawing the snow.

Figure 6:
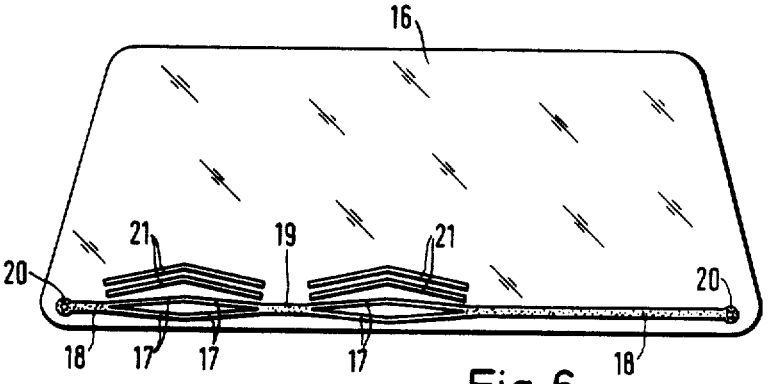
FIG. 6 is the view of a windshield comprising separate profiles for the wiping edges and for the heating conductors.

FIG. 6 shows a different embodiment in which there are provided in the lower part of the windshield, in the area of the rest position of the wipers, heating conductors 17 which are electrically connected with each other and with the connectors 20 connecting them with the electrical system of the vehicle by the wider connector sections 18, 19. Profiles 21 are located above the heating conductors 17 in a roof-like arrangement, which profiles have only the function of acting as scraping edges for the wiper blades. This design ensures that the water removed by profiles 21 can run off the profiles without interference.

Figure 7:
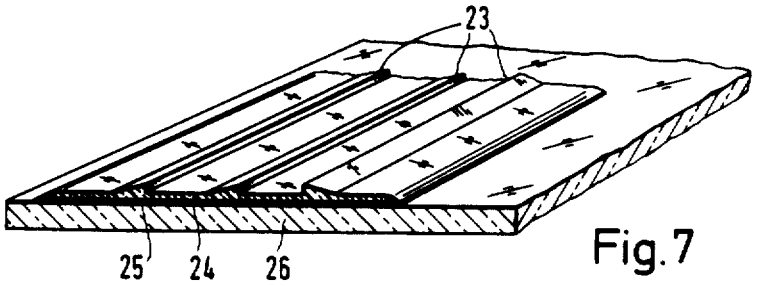
FIG. 7 is a plate comprising profiles for subsequent installation on a windshield.

In the embodiment shown in FIG. 7, profiles 23 with wedge-shaped cross sections are integral parts of a plate 24 which is subsequently attached as a whole to the windshield. Plate 24 with profiles 23 may, in particular, consist of a sufficiently hard transparent plastic. Plate 24 is glued to windshield 26 by means of adhesive layer 25.

It is particularly advantageous to provide the strip-shaped profiles according to the invention in the lower area of windshields used on car bodies where the lower part of the windshield is hidden by the engine hood. In such recessed windshields the wiper, too, lies in its rest position below the level of the hood. In this arrangement the strip-shaped profiles according to the invention can be placed so low on the windshield that they are covered by the hood and are not visible.

Figure 8:
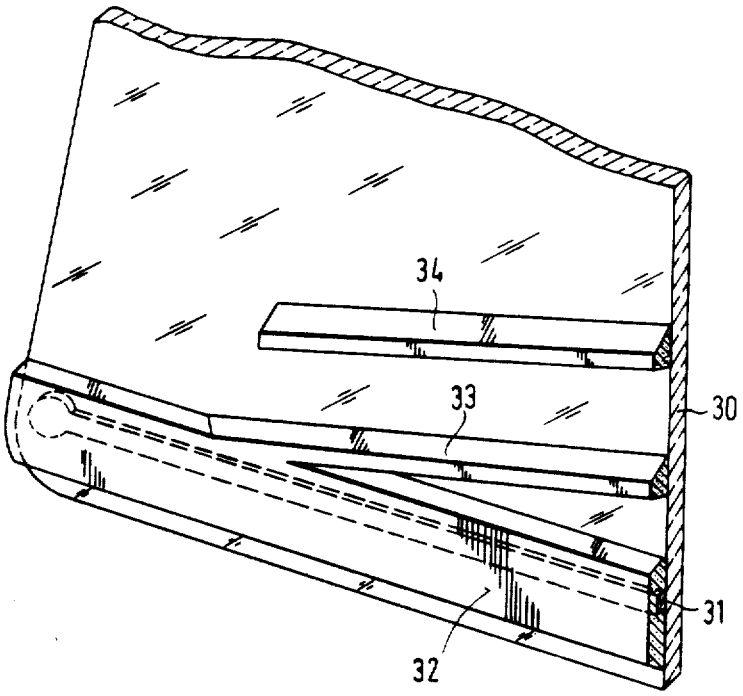
FIG. 8 is a further embodiment of a windshield according to the invention.

FIG. 8, finally, shows partly as a view, partly in cross section another embodiment of a windshield comprising an electric heating device in its lower part in order to free by heating the wiper located there, when it is frozen so that it cannot move or when snow has accumulated there which interferes with the movement of the wiper. In this design an imprinted strip baked onto the glass plate and consisting of a conductive silver compound is used as heating conductor 31. In order to protect heating conductor 31 and simultaneously make the glass plate opaque in this area, a layer 32 consisting of an opaque ceramic baking enamel which absorbs radiant heat is applied over heating conductor 31 in a relatively wide area as described in German Patent Application No. P 29 02 748. The black baking enamel obtainable from BLYTHE COLOURS B. V. under catalog number 39.269/5/63 is again used as baking enamel. It is applied by screen printing. In the same printing operation used for applying layer 32, profiles 33 and 34 are applied, which form the scraping edges for the wiper blades. Lower profile 33 is joined to layer 32 without interruption. As a result of this design a run-off surface for the water scraped off by the scraping edge of profile 34, which causes the water to flow to the side to a point outside the area wiped by the wiper blade.

I claim:

1. A windshield of plate glass for an automobile vehicle comprising on its external surface in the area covered by the path of the wiper blades at least one continuous scraping edge for each of the wiper blades, in which each scraping edge is formed by a raised strip-shaped profile disposed on the surface of the glass plate above the parked position of each blade and [arranged in the shape of a roof, each of said roof-shaped scraping edges] having the form of an inverted V with an obtuse angle included between the two arms of the inverted V, the length of each strip-shaped profiles being approximately equal to the length of each blade.

2. A windshield according to claim 1 for a vehicle with windshield wipers which lie in their rest position below the level of the engine hood, in which the strip-shaped profiles are located in the lower section of the windshield which lies below the level of the hood.

3. A windshield according to claim 1 in which the strip-shaped profiles are located below the normal lower reversing point of the wiper blades and above the [lower reversing point of the] parked position of the wiper blades and are passed over by the wiper blades after a number of normal wiper cycles as a result of an appropriate control circuit for the wiper movement.

4. A windshield according to claim 1 in which the windshield consists of laminated glass.

5. A windshield according to claim 1 in which the strip-shaped profiles consist of an electrically conducting material and are provided with connections to the electrical system of the vehicle and serve as heating conductors.

6. A windshield according to claim 5 in which the windshield consists of laminated glass and in which the strip-shaped profiles are baked on during the bending operation of the glass plates.

7. A windshield according to claim 1 in which the strip-shaped profiles are molded onto a base plate which is attached to the windshield as a whole.

8. A windshield according to claim 7 in which the strip-shaped profiles and the base plate consist of transparent plastic.

*9. A windshield of plate glass for an automobile vehicle, comprising on its external surface in the area covered by the path of the wiper blades at least one continuous scraping edge for each of the wiper blades, in which each scraping edge is formed by a raised strip-shaped profile disposed on the surface of the glass plate above the parked position of each blade and having the form of an inverted U, the length of each of said strip-shaped profiles being approximately equal to the length of each blade.*

*10. A windshield according to claim 9 in which both arms of each said inverted-U-shaped profile are positioned at a sufficient angle with the horizontal to facilitate the running off of water therefrom.*

*11. A windshield of plate glass for an automobile vehicle having at least one windshield wiper, comprising on its external surface in the area covered by the path of the wiper blade at least one continuous scraping edge for the wiper blade, in which said scraping edge is formed by a raised elongated profile disposed on the surface of the glass entirely above the parked position of the blade,*

*said profile comprising a ceramic baking enamel material of the type which is applicable in paste form to plate glass, and*

*said profile being bonded by fusion directly to the plate glass material of the windshield.*

*12. A windshield according to claim 11 in which said scraping edge extends over substantially the entire width of said windshield.*

*13. A windshield according to claim 11 in which substantially all of said elongated profile is positioned at a sufficient angle with the horizontal to facilitate the running off of water therefrom.*

*14. A plate glass windshield for a motor vehicle having at least one windshield wiper, comprising on its external surface in the area covered by the path of the wiper at least one continuous scraping edge for cleaning the blade thereof,*

*said scraping edge being formed by a raised elongated strip disposed on the surface of the windshield entirely above the parked position of said blade,*

*said strip having a principal raised portion, and a tapered portion of decreasing thickness between the principal raised portion and the surface of the windshield, and*

*said strip including enamel-type material bonded by fusion directly to the plate glass material of the windshield.*

*15. A windshield according to claim 14 in which said enamel-type material is a ceramic baking enamel material of the type which is applicable in the form of paste to cold plate glass.*

*16. A windshield according to claim 14 in which said enamel-type material is a screen-printable material.*

*17. A windshield according to claim 14 in which said enamel-type material includes fused material which has been fused at a high temperature.*

*18. A windshield according to claim 17 in which said high temperature is approximately* 580° to 620° C.

*19. A windshield according to claim 14 in which said enamel-type material is a ceramic baking enamel material of the type which is applicable in the form of paste to cold plate glass by screen printing and includes fused material which has been fused at a high temperature.*

*20. A windshield according to claim 19 in which said high temperature is approximately* 580° C. to 620° C.

*21. A windshield according to claim 14 in which said windshield includes thermally treated glass and said enamel-type material includes thermally treated enamel-type material which has been thermally treated at substantially the same temperature as said thermally treated glass.*

*22. A windshield according to claim 21 in which said windshield includes thermally bent glass.*

*23. A windshield according to claim 21 in which said windshield includes thermally prestressed glass.*

*24. A windshield according to claim 21 in which said windshield includes thermally bent and prestressed glass.*

*25. A windshield according to claim 21 in which said windshield includes thermally tempered glass.*

*26. A windshield according to claim 14 in which said elongated strip includes electrically conducting material adapted for connection to the electrical system of the vehicle for heating said windshield.*

*27. A windshield according to claim 9 in which substantially all of each said inverted-U-shaped profile is positioned at a sufficient angle with the horizontal to facilitate the running off of water therefrom.*

*28. A plate glass windshield for a motor vehicle having at least one windshield wiper, comprising*

*at least one scraping edge on the external surface of the windshield in the area swept by the wiper for scraping debris from the wiper,*

*said scraping edge being formed by a raised elongated strip on the windshield located entirely above the parked position of said wiper so as to scrape such debris from said wiper at least during upward wiper movement,*

*said strip consisting of a ceramic baking enamel material of the type which is applicable in paste form to plate glass, and*

*said strip being bonded by fusion directly to the plate glass material of the windshield.*

*29. A windshield according to claim 28, in which said enamel material is a screen-printable material.*

*30. A windshield according to claim 29, in which said enamel includes fused material which has been fused at a high temperature.*

*31. A windshield according to claim 30, in which said high temperature is approximately* 580° to 650° C.

*32. A windshield according to claim 31, in which said high temperature is approximately* 580° to 620° C.

*33. A windshield according to claim 28, in which said strip has a principal raised portion, and a tapered portion of decreasing thickness between said principal raised portion and the surface of the windshield.*

*34. A windshield according to claim 33, in which said enamel material is screen-printable and includes material which has been fused at high temperature.*

*35. A windshield according to claim 34, in which said high temperature is approximately* 580° to 620° C.

*36. A windshield according to claim 35, in which said windshield includes thermally treated glass and said*

*enamel material includes material which has been thermally treated at substantially the same temperature as said thermally treated glass.*

*37. A plate glass windshield for a motor vehicle having at least one windshield wiper, comprising*

*at least one scraping edge on the external surface of the windshield in the area swept by the wiper for scraping debris from the wiper,*

*said scraping edge being formed by a raised elongated strip located entirely above the parked position of said wiper so as to scrape debris from the wiper at least during upward wiper movement, substantially all of said strip being oriented at an angle to the horizontal so as to facilitate the running off of water and debris from the strip,*

*said strip consisting of a ceramic baking enamel material of the type which is applicable in paste form to plate glass, and*

*said strip being bonded by fusion directly to the plate glass material of the windshield.*

*38. A windshield according to claim 37, wherein said strip has a principal raised portion, and a tapered portion of decreasing thickness between the principal raised portion and the surface of the windshield.*

*39. A windshield according to claim 38, in which said enamel material is screen-printable and includes material which has been fused at high temperature.*

*40. A windshield according to claim 39, in which said high temperature is approximately* 580° to 620° C.

*41. A windshield according to claim 40, in which said windshield includes thermally treated glass and said enamel material includes material which has been thermally treated at substantially the same temperature as said thermally treated glass.*

* * * * *